United States Patent Office 3,408,422
Patented Oct. 29, 1968

3,408,422
STABILIZATION OF UNSATURATED POLY-
ESTERS AND RESULTING PRODUCTS
Clayton A. May, Orinda, Calif., assignor to Shell Oil Company, New York, N.Y., a corporation of Delaware
No Drawing. Filed Nov. 4, 1964, Ser. No. 408,733
6 Claims. (Cl. 260—837)

ABSTRACT OF THE DISCLOSURE

New compositions containing stabilized unsaturated polyesters are disclosed. These compositions comprise (1) a hydroxy-containing ethylenically unsaturated polyester of a glycidyl polyether of a polyhydric phenol and an ethylenically unsaturated monocarboxylic acid and (2) a hydroxyl amine compound, said compound stabilizing the polyester against premature gelation. Uses of the above-noted compositions such as in the preparation of laminates, are also disclosed.

---

This invention relates to the stabilization of unsaturated polyesters and the resulting products. More particularly, the invention relates to a new process for stabilizing ethylenically unsaturated polyesters against premature gelation, and to the stabilized products obtained thereby.

Specifically, the invention provides an economical and highly efficient process for stabilizing ethylenically unsaturated polyesters and particularly the hydroxy-containing polyesters obtained by reacting polyepoxides with ethylenically unsaturated carboxylic acids, against premature gelation which comprises incorporating with the said polyesters a compound possessing at least one hydroxy amine group, i.e., a

and preferably a dialkylhydroxylamine or substituted derivative thereof. The invention further provides stable compositions produced by this process.

As a special embodiment, the invention provides a process for imparting a high degree of stability to unsaturated polyesters obtained by reacting a polyepoxide and preferably a glycidyl polyether of a polyhydric phenol with an unsaturated acid such as methacrylic acid which comprises incorporating with the said unsaturated polyester a hydroxylamine compound and preferably a dialkylhydroxylamine and a polyhydric phenol compound, and preferably hydroquinone.

Cured polyepoxides have many desired properties, such as solvent and chemical resistance and good adhesion to metal, and there has been a desire to transfer many of such properties over to the conventional polyester type products. We have found that this can be accomplished by reaction of the polyepoxides with an unsaturated monocarboxylic acid, such as acrylic or methacrylic acid. The products prepared in this manner are easily handled, combine readily with extenders, such as styrene, and cure in the presence of peroxide catalysts to form products having the desired properties.

It has been found, however, that the above-described new unsaturated polyesters, and particularly when combined with unsaturated monomers, such as styrene, have limited shelf life, i.e., after storage at room temperature for some time they undergo premature gelation to form products having little utility. Efforts have been made to prevent the gelation by the addition of known stabilizing materials but the results have not been too satisfactory. In many cases, the stabilizing materials have added undesirable color to the product and/or have interfered with the cure of the polyester. It would be very desirable to have stabilizing material which would not affect color, would not interfere with the cure and could be used in very small amounts.

It is therefore an object of the present invention to provide a process for stabilizing unsaturated polyesters. It is a further object to provide a process for stabilizing ethylenically unsaturated polyesters against premature gelation. It is a further object to provide a method for stabilizing unsaturated polyesters and compositions containing the polyesters and unsaturated monomers, such as styrene, against gelation by heat. It is a further object to provide compositions containing stabilized unsaturated polyesters that can be cured to form products having outstanding properties. It is a further object to provide stabilized compositions containing unsaturated polyesters that can be used in preparation of reinforced plastic products, moldings, coatings, and the like. These and other objects of the invention will be apparent from the following detailed description thereof.

It has now been discovered that these and other objects can be accomplished by the process of the invention which comprises incorporating with the ethylenically unsaturated polyesters, and preferably those obtained by reacting polyepoxides with unsaturated carboxylic acids, a stabilizing amount of a material possessing at least one hydroxy amine group and preferably a dialkyl hydroxylamine or substituted derivative thereof. It has been found that by the addition of these hydroxylamine compounds to compositions containing the unsaturated polyesters one can obtain compositions which have very good stability against premature gelation on storage. In addition, it has been found that the resulting compositions can be easily cured by conventional techniques to form products having excellent physical properties such as chemical resistance, heat resistance and the like.

It has been further found that a portion of the hydroxylamine can be replaced with a polyhydric phenol, such as hydroquinone, and still obtain efficient stabilization.

It has also been surprisingly found that the new stability agents are effective even in the presence of polymerization promoters, such as aromatic amines.

The unsaturated polyesters to be stabilized by the presence of the invention include those materials possessing at least one ethylenic group and a plurality of ester groups, i.e.,

groups. This includes the monomeric esters as well as the polymeric esters as well as those which may be further substituted with various types of substituents. Examples of these include, among others, unsaturated ester of polycarboxylic acids, such as diallyl phthalate, divinyl adipate, diallyl succinate, diallyl glutarate, dicrotyl phthalate, dibutenyl succinate diallyl chlorophthalate and the like, esters of unsaturated acids and polyhydric alcohols, such as ethylene glycol diacrylate, 1,4-butanediol dimethyacrylate, polypropylene glycol diacrylate and 1,5-pentanediol dibutenoate. Other examples include the esters of polycarboxylic acids and polyhydric alcohols wherein one or both reactants possess an unsaturated linkage. Illustrative examples of acids or anhydrides that may be used in making such esters include, among others, maleic acid, fumaric acid, itaconic acid, tetrahydrophthalic acid, cyclohexenedicarboxylic acid, chlorotetrahydrophthalic acid, dichloromaleic acid, the corresponding anhydrides, and the like. A portion of these unsaturated acids may be replaced by non-ethylenically unsaturated acids, such as glutaric, pimelic, adipic, succinic, sebacic, isosebacic, phthalic, isophthalic, terephthalic, oxalic, malonic, hexadecanedicarboxylic, diglycolic, thiodivaleric, sulfonyldivaleric, diphenyldicarboxylic, diphenic, p-phenylene diacetic, cis-hexahydroterephthalic and the like acids and the corresponding anhydrides. Polyhydric alcohols that may be used with the above-described unsaturated carboxylic acids include, among others, ethylene glycol, diethylene glycol, trimethylene glycol, tetramethylene glycol, pinacol, trimethylol propane, trimethylol ethane, mannitol, sorbitol, glycerol, pentaerythritol, polyvinyl alcohol, polyallyl alcohol, hydrated glycidyl ethers of polyhydric phenols and the like. It is also possible to use polyesters of any of the above-described saturated polycarboxylic acids and one or more unsaturated polyhydric alcohols alone or in admixture with any of the above-noted saturated polyhydric alcohols. Unsaturated alcohols that may be utilized include, among others, butenediol, cyclohexenediol, 2,5-docadienediol-1,12, butynediol and the like.

The above-described unsaturated polyesters may be prepared by a variety of known methods, some of which are described in "Unsaturated Polyesters" by Herman Boenig (1964).

A particularly preferred group of polyesters to be employed are the hydroxy-substituted ethylenically unsaturated polyesters as may be obtained by reacting polyepoxides with ethylenically unsaturated carboxylic acids.

The polyepoxides used in the process of the invention comprise those compounds possessing more than one vic-epoxy group, i.e., more than one

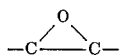

group. These polyepoxides may be saturated or unsaturated, aliphatic, cycloaliphatic, aromatic or heterocyclic and may be substituted if desired with non-interfering substituents, such as halogen atoms, phosphorus atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the glycidyl ethers of novolac resins, i.e., phenol-aldehyde condensates. Preferred resins of this type are those of the formula:

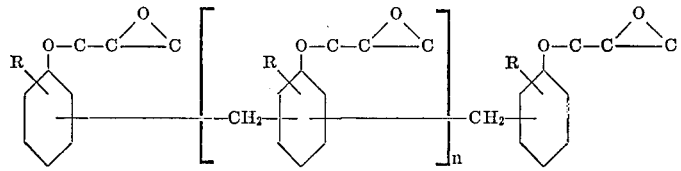

wherein R is hydrogen or an alkyl radical and $n$ is an integer of 1 to about 10. Preparation of these polyepoxides is illustrated in U.S. 2,216,099 and U.S. 2,658,885.

Other examples include the epoxidized esters of the polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecandienoate, butyl 9,12,15-octadecatrienoate, butyl eleostearate, mono or diglycerides of tung oil, fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, diglycidyl phthalate, diglycidyl adipate, diglycidyl isophthalate, di(2,3-epoxybutyl) adipate, di(2,3 - epoxybutyl) oxalate, di(2,3-epoxyhexyl) succinate, di(3,4-epoxybutyl) maleate, di(2,3-epoxyoctyl) pimelate, di(2,3 - epoxybutyl) phthalate, di(2,3-epoxyoctyl) tetrahydrophthalate, di(4,5 - epoxydodecyl) maleate, di(2,3 - epoxybutyl) terephthalate, di(2,e-epoxypentyl) thiodipropionate, di(5,6-epoxytetradecyl) diphenyldicarboxylate, di(3,4-epoxyheptyl) sulfonyldibutyrate, tri (2,3-epoxybutyl) 1,2,4-butanetricarboxylate, di(5,6-epoxypentadecyl) tartarate, di(4,5 - epoxytetradecyl) maleate, di (2,3-epoxybutyl) azelate, di(3,4-epoxybutyl) citrate, di(5, 6 - epoxyoctyl) cyclohexane - 1,3 - dicarboxylate, di(4,5-epoxyoctadecyl) malonate.

Another group of the epoxy-containing materials include those epoxidized esters of unsaturated alcohols and unsaturated carboxylic acids, such as glycidyl glycidate, 2,3-epoxybutyl 3,4-epoxypentanoate; 3,4-epoxyhexyl, 3,4-epoxypentanoate; 3,4 - epoxycyclohexyl 3,4 - epoxycyclohexyl methyl epoxycyclohexane carboxylate.

Still another group of the epoxy-containing materials include epoxidized derivatives of polyethylenically unsaturated polycarboxylic acids, such as, for example, dimethyl 8,9,12,13 - diepoxyeicosanedioate; dibutyl 7,8,11,12 - diepoxyoctadecanedioate; dioctyl 10,11 - diethyl - 8,9,12,13-diepoxy - eicosanedioate; dihexyl 6,7,10,11 - diepoxyhexadecanedioate; didecyl 9 - epoxy - ethyl-10,11-epoxyoctadecanedioate; dibutyl 3-butyl-3,4,5,6-diepoxycyclohexane-1,2 - dicarboxylate; dicyclohexyl 3,4,5,6-diepoxycyclohexane-1,2-dicarboxylate; dibenzyl 1,2,4,5 - diepoxycyclohexane-1,2-dicarboxylate and diethyl 5,6,10,11-diepoxyoctadecyl succinate.

Still another group comprises the epoxidized polyester obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2 - bis(2 - cyclohexenyl) propane, epoxidized vinyl cyclohexene and epoxidized dimer of cyclopentadiene.

The other component in the reaction comprises an ethylenically unsaturated organic carboxylic acid which may be aliphatic, cycloaliphatic, or aromatic, and may be monocarboxylic or polycarboxylic. Examples of the acids to be utilized include acrylic acid, methacrylic acid, cyclohexene carboxylic acid, maleic acid, crotonic acid, alpha-phenylacrylic acid, tetrahydrophthalic acid, 2,4-octadienedicarboxylic acid, dodecadienoic acid and the like, and corresponding anhydrides.

Particularly preferred acids to be utilized comprise the ethylenically unsaturated acids such as, for example, acrylic acid, methacrylic acid, crotonic acid, alpha-phenylacrylic acid, alpha-cyclohexylacrylic acid, maleic acid, alpha-chloromaleic acid, tetrahydrophthalic acid, itaconic acid, fumaric acid, cyanoacrylic acid, methoxyacrylic acid, and the like, and the anhydrides thereof.

Also particularly preferred are the partial esters of polycarboxylic acids, and particularly the alkyl, alkenyl, cycloalkyl and cycloalkenyl esters of polycarboxylic acids such as, for example, allyl hydrogen maleate, butyl hydrogen maleate, allyl hydrogen phthalate, allyl hydrogen succinate, allyl hydrogen fumarate, butenyl hydrogen tetrahydrophthalate, cyclohexenyl hydrogen maleate, cyclohexyl hydrogen tetrahydrophthalate, and the like, and mixtures thereof.

Coming under special consideration, particularly because of the superior coating properties of the resulting unsaturated polyesters, are the ethylenically unsaturated monocarboxylic acids and unsaturated partial esters, and especially the unsaturated aliphatic monocarboxylic acids containing 3 to 10 carbon atoms, and the alkenyl and alkyl esters of alkenedioic acids containing up to 12 carbon atoms.

Preferred catalysts to be utilized in the process comprise the onium salts, and preferably those containing phosphorous, sulfur or nitrogen, such as, for example, the phosphonium, sulfonium and ammonium salts of inorganic acids. Examples of these include, among others, benzyltrimethylammonium sulfate, tetramethylammonium chloride benzyltrimethylammonium nitrate, diphenyldimethylammonium chloride, benzyltrimethylammonium chloride, diphenyldimethylammonium nitrate, diphenylmethylsulfonium chloride, tricyclohexylsulfonium bromide, triphenylmethylphosphonium iodide, diethyldibutylphosphonium nitrate, trimethylsulfonium chloride, dicyclohexyldiamylphosphonium iodide, benzyltrimethylammonium thiocyanate, and the like, and mixtures thereof.

Preferred onium salts to be employed include those of the formulae

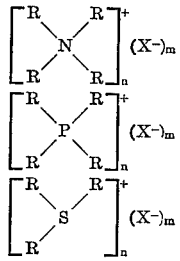

wherein R is a hydrocarbon radical, and preferably an aryl, alkyl, alkenyl, cycloalkyl, cycloalkenyl or alkaryl radical containing up to 12 carbon atoms, X is an ion of an inorganic acid, and particularly a halogen atom, nitrate, sulfate or phosphate radical, $m$ is the valency of the X ion and $n=m$.

The amount of the above-noted polyepoxide and acid to be used in the reaction may vary over a wide range. In general, these reactants are used in approximately chemically equivalent amounts. As used herein and in the appended claims a chemical equivalent amount of the polyepoxide refers to that amount needed to furnish one epoxy group per carboxyl group. Excess amounts of either reactant can be used. Preferred amounts range from about 0.5 to 2 equivalents of carboxylic acid per equivalent of epoxide.

The amount of the catalyst employed may also vary over a considerable range. In general, the amount of the catalyst will vary from about .05% to about 3% by weight and more preferably from .1% to 2% by weight of the reactants.

The reaction may be conducted in the presence or absence of solvents or diluents. In most cases, the reactants will be liquid and the reaction may be easily effected without the addition of solvents or diluents. However, in some cases, whether either or both reactants are solids or viscous liquids it may be desirable to add diluents to assist in effecting the reaction. Examples of such materials include the inert liquids, such as ketones, inert hydrocarbons as xylene, toluene, cyclohexane and the like.

If solvents are employed in the reaction and the resulting product is to be used for coating purposes, the solvent may be retained in the reaction mixture. Otherwise, the solvent can be removed by any suitable method such as by distillation and the like. If the product is not to be used for some time after its formation, it may also be desirable to remove the catalyst used in the preparation, such as by stripping, neutralization and the like.

Temperatures employed in the reaction will generally vary from about 50° C. to about 150° C. In most cases, the reactants will combine in the presence of the new catalysts at a very rapid rate and lower temperatures will be satisfactory. Particularly preferred temperatures range from about 50° C. to 120° C.

The reaction will be preferably conducted under atmospheric pressure, but it may be advantageous in some cases to employ subatmospheric or superatmospheric pressures.

The course of the reaction may be conveniently followed by determination of the acidity. The reaction is considered to be substantially complete when the acidity has been reduced to about .020 eq./100 g. or below.

The process of the invention may be effected in any suitable manner. The preferred method merely comprises adding the polyepoxide, acid, catalyst, and solvent or diluent if desired, in any order and then applying the necessary heat to bring about the reaction. The reaction mixture may then be distilled or stripped to remove any of the necessary components, such as solvents, catalyst, excess reactants and the like.

The polyester products obtained by the above process will vary from liquids to solid resins. The products will possess a plurality of free OH groups and a plurality of ethylenic groups. The products will be of higher molecular weight than the basic polyepoxide from which they are formed and will possess at least more than one ester group per polyepoxide unit.

For many of these applications, the unsaturated polyesters are used in admixture with unsaturated monomers, and preferably liquid monomers possessing at least one $CH_2=C$ group, such as styrene, alpha-methylstyrene, dichlorostyrene, vinyl naphthalene, vinyl phenol and the like, unsaturated esters, such as acrylic and methacrylic esters, vinyl acetate, vinyl benzoate, vinyl chloroacetate, vinyl laurate, and the like, unsaturated acids, such as acrylic and alpha-alkylacrylic acids, butenoic acid, allylbenzoic acid, vinylbenzoic acid, and the like, halides, such as vinyl chloride, vinylidene chloride, nitriles, such as acrylonitrile, methacrylonitrile, diolefins, such as butadiene, isoprene, methylpentadiene, esters of polycarboxylic acids, such as diallyl phthalate, divinyl succinate, diallyl maleate, divinyl adipate, dichloroallyl tetrahydrophthalate, and the like, and mixtures thereof. These are preferably used in amounts varying from about .5% to 90% by weight of the mixture, and preferably 5% to 55% by weight of the mixture.

The stabilizing material to be added to the above-described polyesters include the compounds possessing at least one hydroxy amino group, i.e., a

The radicals attached to the free bonds may be hydrogen or any organic radical but is preferably a hydrocarbon and still more preferably an aromatic, cycloaliphatic or aliphatic hydrocarbon radical. These radicals may also be substituted if desired with non-interfering substituents such as ether, ester, halogen atoms and the like. Examples of these hydroxy amines include, among others, dibenzylhydroxylamine,
benzylhydroxylamine,
dibutylhydroxylamine,
butylbenzylhydroxylamine,
diethylhydroxylamine,
dicyclohexylhydroxylamine,
phenylhydroxylamine,
decylhydroxylamine,
1,4-di(hydroxylamino)butane,
1,5-di(hydroxylamino)pentane,
butylphenyl hydroxylamine,
hexyltolyl hydroxylamine
and the like.

Preferred compounds to be employed are those possessing a

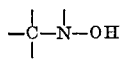

and still more preferably a

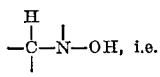

one with a hydrogen atom attached to the alpha carbon atom. Examples of these preferred stabilizers include ethylhydroxylamine, diethylhydroxylamine, dibutylhydroxylamine, dicyclohexylhydroxylamine, benzylhydroxylamine, dibenzylhydroxylamine, allylhydroxylamine and the like, and mixtures thereof. Coming under special consideration are those of the formula

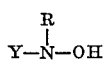

wherein Y— is

or a cyclohexyl radical or a phenyl radical or an alkyl-substituted phenyl radical, and R, $R_1$, $R_2$ and $R_3$ are hydrogen or a hydrocarbon radical containing from 1 to 12 carbon atoms.

The amount of the hydroxylamine material to be employed in the process may vary over a considerable range depending upon the particular agents selected and the ester to be stabilized. In general, the amount of the hydroxylamine may vary from as little as .001% to as high as 10% or higher by weight of the material to be stabilized. Preferred amounts of the stabilizer vary from .005 to .3% by weight.

The stabilization may be accomplished by merely mixing the hydroxylamine compound directly with the unsaturated polyester. The unsaturated polyester may be used as such for insolvent solution or in admixture with other resinous materials. The addition may be made during the preparation of the polyester, or may be thereafter. The hydroxylamine compound may be added as such or in the form of a solvent solution or combination with other materials.

After combination components should be thoroughly mixed as by stirring, blending and the like.

Modifying agents such as plasticizers, pigments, and fillers may be added to the material to be stabilized before, at the same time as or after the addition of the hydroxylamine.

The new compositions of the invention are characterized by their improved storage stability, i.e., improved resistance to premature gelation when exposed to storage temperatures say from 0° F. to about 140° F. The length of the stabilization will vary with the temperature as shown in the working examples at the end of the specification. At storage temperatures of 40° F. or below the compositions have indefinite stability.

The stabilized polyester compositions can be used for a variety of applications. Those compositions containing the polyesters by themselves as well as those extended with unsaturated monomers such as styrene and the like can be easily polymerized at elevated temperatures to form valuable plastic products.

The process of the invention may be used to stabilize the unsaturated esters by themselves or as mixtures of the esters with any of the above-described extenders. As the stabilization problem is particularly acute with the compositions containing the vinyl monomers, these are the preferred materials to be used in the process. When the polyester is used in combination with the above components, such as styrene, the amount of the other component may vary over a wide range, but it is generally preferred to have at least 5% by weight of the polyester present. In working with components, such as the unsaturated monomers as styrene, it is preferred to utilize from 1% to about 65% of the dissimilar monomer and from 99% to 35% of the new hydroxy-substituted polyester.

The polymerization of the above-noted polyesters or mixtures with monomers may be accomplished by any suitable method. The preferred method comprises heating the polyester or its mixture with monomers in the presence of a free radical yielding catalyst. Examples of such catalysts include the peroxides, such as benzoyl peroxide, tertiary butyl hydroperoxide, ditertiary butyl peroxide, hydrogen peroxide, potassium persulfate, methyl cyclohexyl peroxide, cumene hydroperoxide, acetyl benzoyl peroxide, tetralin hydroperoxide, phenylcyclohexane hydroperoxide, tertiary butylisopropylbenzene hydroperoxide, tertiary butyl peracetate, tertiary butylacetate, tertiary butyl perbenzoate, ditertiary amyl perphthalate, ditertiary butyl peradipate, tertiary amyl percarbonate, and the like, and mixtures thereof; azo compounds such as 2,2'-azobisisobutyronitrile, dimethyl 2,2'-azobiisobutyrate, 2,2'-azobis(2,4-dimethylvaleronitrile, 2,2'-azobiisotulyamide), and the like. Particularly preferred catalysts include the diaroyl peroxide, tertiary alkyl hydroperoxides, alkyl peresters of carboxylic acids and particularly those of the above-noted groups which contain no more than 18 carbon atoms per molecular and have a decomposition temperature below 150° C.

Other materials may also be added to the mixtures before or during polymerization. This includes plasticizers, stabilizers, extenders, oils, resins, tars, asphalts and the like, as well as all types of coloring or pigments to give the material the desired color.

The above-noted components may be mixed in any order and then the combined mixture heated to the desired temperature. Temperatures employed in the polymerization will vary depending upon the reactants and catalysts selected. In general, polymerization temperatures may vary from about 20° C. to about 200° C. and more preferably from 20° C. to 175° C.

The unsaturated polyesters and their above-noted mixtures with other monomers may be utilized in a wide variety of different applications. They may be utilized in the preparation of coatings and impregnating compositions, in the preparation of adhesives for metals, wood, cement and the like, and in the preparation of reinforced composite products, such as laminated products, filament windings and the like. In this latter application, the polyester compositions are applied to the fibrous products, such as glass fibers or sheets, the material formed into the desired object and heated to effect cure of the polyester composition.

The following examples are given to illustrate the process of the invention. It should be understood that the examples are given for the purpose of illustration and the invention is not to be regarded as limited to any of the specific conditions recited therein. Unless otherwise indicated parts in the examples are parts by weight.

Example I

This example illustrates the preparation of a composition containing a viscous liquid unsaturated polyester prepared from glycidyl polyether of 2,2-bis(4-hydroxyphenyl)propane and methacrylic acid having the structure:

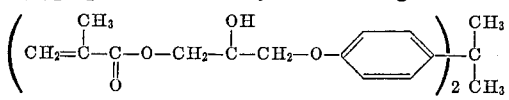

and dibenzylhydroxylamine. The example also illustrates the superiority of the claimed compositions in comparison to the non-stabilized polyester as well as polyester compositions containing other stabilizing materials.

(A) 66.6 parts of the above-noted polyester was combined with 33.3 parts of styrene. To this mixture was added stabilizing amounts of dibenzylhydroxylamine as indicated in the table. The time for gelation was determined for the various temperatures. The period which was free of gelation, or the shelf-life of the comparison, is indicated in the table in terms of days:

| Storage Temperature | Shelf Life of Control | Shelf Life of Compl. Containing Dibenzylhydroxylamine | |
|---|---|---|---|
| | | .05 (amt. added) | 0.10 (amt. added) |
| 75° F | 5 | 82 | 82 |
| 100° F | 0 | 30 | 34 |
| 140° F | 0 | 6 | 10 |

(B) The above-described unsaturated polyester composition containing the 33% styrene was also combined with varying amounts of other types of materials which failed to give the desired stabilizing effect. This is indicated in the table below:

| Storage Temperature | Shelf Life of Comp. Containing Additive as Indicated | | | | | |
|---|---|---|---|---|---|---|
| | p-Methoxy phenol | | Butylcatechol | | Diphenylamine | |
| | 0.5 | 0.10 | 0.5 | .10 | 0.5 | .10 |
| 75° F | 15 | 17 | 38 | | 21 | 31 |
| 100° F | 5 | 4 | 10 | | 6 | 6 |
| 140° F | 1 | 1 | 1 | | <1 | <1 |

P-benzoquinone was also tried but found to drastically retard the cure and discolor the cured product so it was of little practical value in this application.

Example II

This example illustrates the preparation and superior properties of a composition containing the unsaturated polyester as in Example I, 50% styrene and dibenzylhydroxylamine as the stabilizer.

50 parts of the above-noted polyester was combined with 50 parts of styrene. To this mixture was added stabilizing amounts of dibenzylhydroxylamine as indicated in the table. The time of gelation was determined for the various temperatures. The period which is free of gelation is indicated in the table in terms of days.

| Storage Temperature | Shelf Life of Control | Shelf Life of Comp. Containing Dibenzylhydroxylamine | |
|---|---|---|---|
| | | 0.05 | 0.10 |
| 75° F | 20 | 214 | 214 |
| 100° F | 0 | 55 | 79 |
| 140° F | 0 | 10 | 16 |

Example III

This example illustrates the use of the hydroxylamine stabilizers in combination with phenols, such as hydroquinone.

50 parts of the polyester defined in Example I was combined with 50 parts of styrene and to this mixture was added dibenzylhydroxylamine and hydroquinone in the amounts indicated in the table. The shelf life of the compositions at the various storage temperatures is indicated in the table below in terms of days:

| Storage Temperature | Shelf Life of Control | Shelf Life of Comp. Containing Stabilizer | |
|---|---|---|---|
| | | 0.05 hydroxylamine 0.01 hydroquinone | 0.10 hydroxylamine 0.01 hydroquinone |
| 75° F | 20 | 153 | 189 |
| 100° F | 0 | 54 | 81 |
| 140° F | 0 | 12 | 17 |

Example IV

This example illustrates the use of the hydroxylamine stabilizers in combination with phenols, such as hydroquinone, and with cure promoters, such as dimethylaniline.

50 parts of the polyester defined in Example I was combined with 50 parts of styrene and to this mixture was added dibenzylhydroxylamine, hydroquinone and dimethylaniline in the amount indicated in the table. The shelf life of the compositons at the various storage temperatures is indicated in the table below in terms of days:

| Storage Temperature | Shelf Life of Control | Shelf Life of Comp. Containing Stabilizer | |
|---|---|---|---|
| | | 0.05 hydroxylamine 0.01 hydroquinone 0.025 dimethylaniline | 0.10 hydroxylamine 0.01 hydroquinone 0.05 dimethylaniline |
| 75° F | 20 | 146 | 189 |
| 100° F | 0 | 71 | 84 |
| 140° F | 0 | 11 | 17 |

Example V

A composition was prepared by mixing 66.6 parts of styrene, 33.3 parts of the polyester of Example I, dibenzylhydroxylamine and hydroquinone as indicated in the table. The time for gelation was determined for the various storage temperatures. The shelf life is indicated in the table in terms of days:

| Storage Temperature | Shelf Life of Control | Shelf Life of Comp. Containing Stabilizer | |
|---|---|---|---|
| | | 0.05 hydroxylamine 0.01 hydroquinone | 0.10 hydroxylamine 0.01 hydroquinone |
| 75° F | 5 | 71 | 64 |
| 100° F | 0 | 28 | 31 |
| 140° F | 0 | 7 | 9 |

Example VI

A composition was prepared by forming a mixture of 33.3 parts of styrene and 66.6 parts of the unsaturated polyester defined in Example I and to this mixture was added stabilizing amounts of diethylhydroxylamine as indicated in the table. The time for gelation was determined for the various temperatures. The shelf-life of the compositions is indicated in the table below:

| Storage Temperature | Shelf Life of Control | Shelf Life of Comp. Containing Diethylhydroxylamine | |
|---|---|---|---|
| | | 0.022 (amt. added) | 0.0457 (amt. added) |
| 75° F | 5 | 82 | 91 |
| 100° F | 0 | 24 | 35 |
| 140° F | 0 | 4 | 5 |

Example VII

Example I is repeated with the exception that the ratio of styrene to the unsaturated polyester was 1:9. Related results are obtained.

Example VIII

Examples I to VII are repeated with the exception that the unsaturated polyester is a reaction product of glycidyl polyether of 2,2 - bis(4 - hydroxyphenyl)propane and acrylic acid. Related results are obtained.

Example IX

Examples I to VII are also repeated with the exception that the stabilizer is diphenylhydroxylamine. Related results are obtained.

Example X 100 parts of the neat unsaturated polyester without the styrene was combined with .2 part of dibenzylhydroxylamine and the mixture placed in an oven at 80° C. for 7 hours. At the end of that time, the product was still a viscous liquid.

The above experiment was repeated without the addition of the dibenzylhydroxylamine stabilizer. In this case, the mixture had set to a hard resin after heating for 7 hours at 80° C.

Example XI

Example I is repeated using a polyester of maleic anhydride, isophthalic anhydride and ethylene glycol. Related results are obtained.

Example XII

Example I is repeated with the exception that the stabilizer is as follows: dibutylhydroxylamine, methylamylhydroxylamine, butylhydroxylamine, dodecylhydroxylamine and dicyclohexylhydroxylamine. Related results are obtained.

I claim as my invention:

1. A composition stabilized against premature gelation comprising (1) a hydroxy-containing ethylenically unsaturated polyester of a glycidyl polyether of a polyhydric phenol and an ethylenically unsaturated monocarboxylic acid, and (2) a hydroxylamine having the formula $$Y-\underset{\underset{H}{|}}{N}-OH$$

wherein Y— is $R_2$

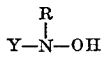

or a cyclohexyl radical or a phenyl radical or an alkyl-substituted phenyl radical, and R, $R_1$, $R_2$ and $R_3$ are hydrogen or a hydrocarbon radical containing from 1 to 12 carbon atoms.

2. A cured composition obtained by heating the composition of claim 1 with a peroxide catalyst.

3. A composition comprising a mixture of (1) a styrene compound, (2) a hydroxy-substituted ethylenically unsaturated polyester of a glycidyl polyether of a polyhydric phenol and an acrylic acid, (3) a polyhydric phenol and (4) a hydroxylamine having the formula $$Y-\underset{\underset{H}{|}}{N}-OH$$

wherein Y— is

or a cyclohexyl radical or a phenyl radical or an alkyl-substituted phenyl radical, and R, $R_1$, $R_2$, and $R_3$ are hydrogen or a hydrocarbon radical containing from 1 to 12 carbon atoms.

4. A cured composition obtained by heating the composition of claim 3 with a tertiary alkyl peroxide.

5. A composition stabilized against premature gelation comprising (1) a hydroxy-containing ethylenically unsaturated polyester of a glycidyl polyether of 2,2-bis(4-hydroxyphenyl)propane and methacrylic acid and (2) a diethylhydroxylamine.

6. A composition comprising a mixture of (1) an unsaturated polyester of a glycidyl polyether of 2,2-bis(4-hydroxyphenyl) propane and an acrylic acid, and (2) a dissimilar ethylenically unsaturated monomer and (3) dibenzyl hydroxylamine.

References Cited

UNITED STATES PATENTS

| | | | |
|---|---|---|---|
| 3,301,743 | 1/1967 | Fekete et al. | 260—837 XR |
| 3,317,465 | 5/1967 | Doyle et al. | 260—47 |
| 2,567,109 | 9/1951 | Howard | 260—85.5 |
| 2,759,913 | 8/1956 | Hulse | 260—75 |
| 3,148,225 | 9/1964 | Albert | 260—85.1 |

DONALD E. CZAJA, *Primary Examiner.*

M. J. WELSH, *Assistant Examiner.*